United States Patent
Laing

[11] 3,732,445
[45] May 8, 1973

[54] ROTATING POLE RINGS SUPPORTED IN CONTACTLESS BEARINGS

[76] Inventor: Nickolaus Laing, Hofener Weg 35-37, Aldingen near Stuttgart, Germany

[22] Filed: Dec. 14, 1970

[21] Appl. No.: 97,771

[30] Foreign Application Priority Data

Dec. 16, 1969 Austria..................................11681

[52] U.S. Cl......................310/90, 310/166, 417/420
[51] Int. Cl...............................................H02k 5/16
[58] Field of Search..................310/90, 86, 87, 166, 310/103; 417/420; 415/54

[56] References Cited

UNITED STATES PATENTS

| 3,447,469 | 6/1969 | Laing | 310/166 |
| 3,354,833 | 11/1967 | Laing | 417/420 |
| 3,581,132 | 5/1971 | Laing | 310/166 |
| 3,490,379 | 1/1970 | Laing | 417/420 |

Primary Examiner—R. Skudy
Attorney—Pennie, Edmonds, Morton, Taylor & Adams

[57] ABSTRACT

A rotating magnetic machine having two pole rings defining a common air gap, said air gap being arranged on the surface of a rotational body and at the same time defining the bearing gap for supporting the rotor of the machine and having a flowable material in the bearing gap for producing a hydrodynamic bearing film.

17 Claims, 6 Drawing Figures

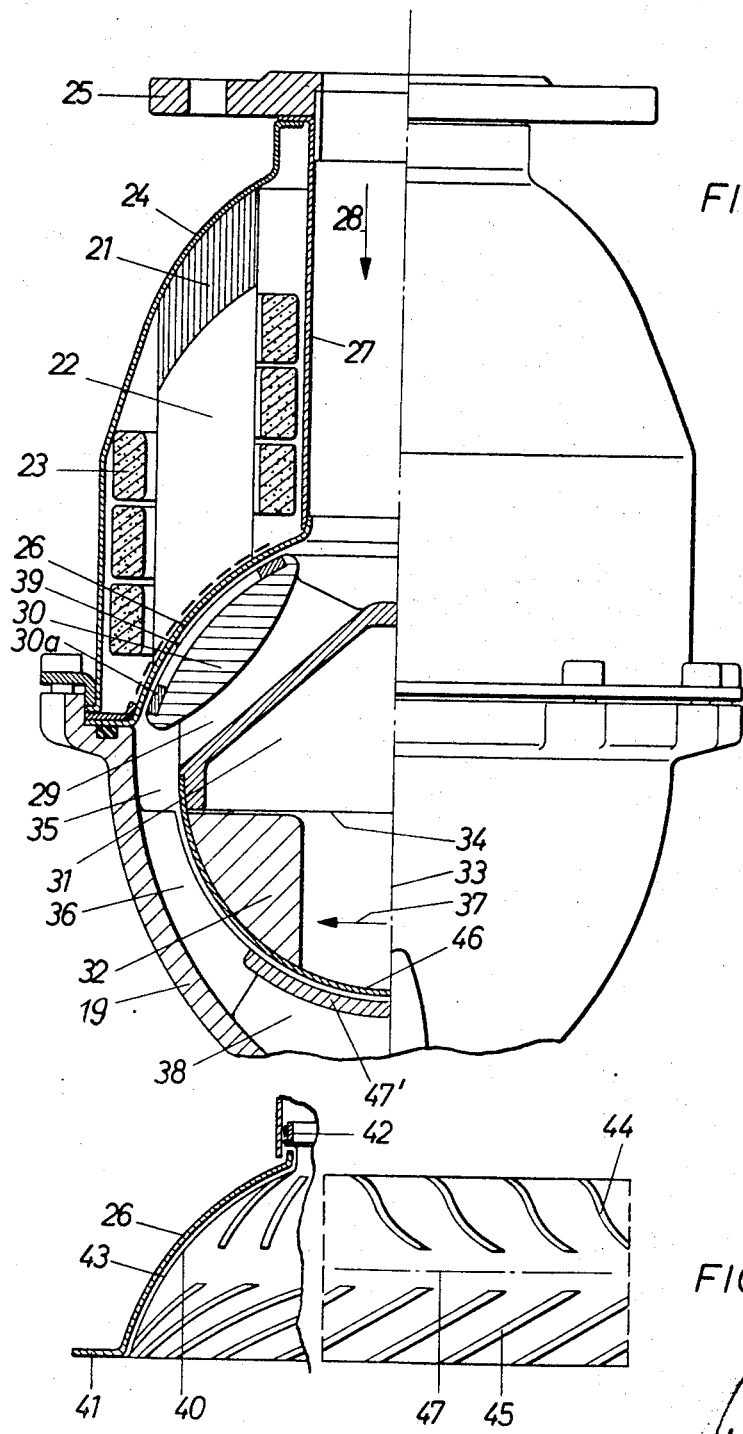

ROTATING POLE RINGS SUPPORTED IN CONTACTLESS BEARINGS

DESCRIPTION OF THE INVENTION

The invention relates to the bearing arrangement of the rotating pole rings of magnetic machines, such as electric motors, magnetic torque couplings and magnetic transmissions. Such rotating magnetic machines comprise a first pole ring with magnetic poles producing a rotating magnetic field, the magnetic poles being arranged to face a rotational surface, a second driven magnetic pole ring through which the magnetic fluxes of the first magnetic pole ring are conducted and returned to the first pole ring, and a bearing arrangement for at least one of the pole rings. Between the two pole rings an air gap is left which should be as small as possible in the direction of the magnetic lines of force.

The bearing arrangement of a rotating pole ring requires support in the radial as well as the axial direction which as a rule can be effective in the case of shafts supported radially and axially and rotatable only about the axis of rotation of the machine.

Rotating magnetic machines have become known in which a spherical bearing takes the place of a shaft which is supported for rotation only, the spherical bearing permitting universal pivoting of the rotating pole ring. By suitably arranging the centers of the isodynamic lines on the poles of the two pole rings which face each other, the rotating pole ring which is supported magnetically solely by a spherical surface is stabilized in such a way that it behaves like a rotor in rigid bearings when it runs undisturbed. Such rotating magnetic machines, which have found application particularly in pump design, have air gaps which lie on the surface of a sphere whose center coincides with the center of the spherical surface of the bearing. Whilst concave and convex surfaces sliding over each other constitute the bearing of small machines, contactless operation by means of hydrodynamically supporting bearings is used for large machines. The latter entails associated convex and concave bearing members of large diameter. For this purpose the spherical surfaces of the bearing members have to be very precisely concentric with the spherical air gap which entails precision work of a high order.

The invention provides a way in which a contactless bearing arrangement for rotating magnetic machines can be accomplished in a simple manner.

According to the invention the concave surface of the pole ring having inwardly directed magnetic poles and the convex surface of the rotating pole ring having outwardly directed magnetic poles serve to define not only the air gap but at the same time also the bearing gap. A flowable material is introduced into the bearing gap whose pressure is higher than the quotient of the axially directed vector of magnetic force and the projection of the magnetic region in the surface of rotation. The pressure can be produced in a manner known per se by means of circumferential grooves, e.g. spiral grooves, but it is also possible, by means of an auxiliary device, e.g. a compressor, to pressurise a medium sufficiently to raise the rotating pole ring against the force of the axially directed vector of magnetic force by a small amount, so that rotation takes place in a contactless manner. Liquids as well as gases are suitable for use as the flowable material for producing the uninterrupted bearing film. A combination of liquids and gases may also be used for producing the bearing film. By suitable means, e.g. spiral grooves, the liquid is conveyed into the bearing gap along the periphery of the latter only, in which case the pressure of the liquid film increases considerably. At the same time however the liquid is by suitable measures heated to such an extent that it evaporates, so that the major part of the bearing film is made up of vapor. In this way the losses caused by shear stresses are considerably reduced. The use of materials of poor thermal conductivity for the surface layer of the pole rings or also the inductive heating of a separating wall arranged in the air gap have been found to be advantageous measures.

If flowable materials of low kinematic viscosity are to be used for forming the bearing film, this results in very small bearing gaps. The smallest bearing gap which is achievable from the point of view of geometry is the sum of the amounts by which the internal surface of the concave pole ring and the external surface of the convex pole ring deviate from the geometric bearing surface. With a view to avoiding the need for tolerances which would be difficult to produce, the invention provides, if desired, covering up one of the pole surfaces with a thin layer and introducing between the pole surface and this layer a readily deformable all liquid material. By this measure point contacts of the two surfaces are avoided; and at the same time an approximately constant bearing gap is achieved. Advantageously the bearing gap is formed in part between spherical surfaces lying on the pole rings, the magnetic forces effecting stabilization of the geometric axis of the rotating pole ring. In lieu of the stabilizing magnetic forces, however, it is also possible to employ a positive connection using a conical gap formed in part between conical surfaces lying on the pole rings. With a view to avoiding dry friction during startup, the invention provides materials of low static frictional properties for the opposing surfaces in the bearing gap, such as for example, polytetraflourethylene, but the bearing gap may also be maintained at a minimum value by means of bearing regions which are load bearing during the starting-up phase only, so that dry friction by mutual contact of larger surfaces is eliminated.

The main fields of application of the invention are;
a. Liquid pumps or mixers.
   The pressure in the bearing gap is preferably produced by spiral grooves with the use of uncontaminated media. When liquids having materials in suspension are being conveyed, either water from the mains or compressed air are employed for raising the rotating pole ring. In the case of volatile liquids the bearing film is advantageously formed by the vapor of the medium being conveyed. Where the media being conveyed are of high viscosity, a reduction in the viscosity of the medium forming the bearing film is accomplished by suitable heat insulation of the sliding members or artificial heating of the bearing gap. In cases where heterogeneous materials are conveyed, such as happens frequently, for example, in the petrochemical field, liquids of low viscosity are pressed into the bearing gap.
b. Centrifugal compressors.

Here the compressed gas forms the flowable material for producing the lifting-off effect. Where gases which are to be condensed are conveyed, e.g. in refrigeration circuits, a small partial current of the condensate is conveyed into the bearing gap.

c. Gyroscopic transmitters.

For gyroscopic transmitters, such as gyroscopic compasses or gyros, for indicating or stabilizing devices, the bearing film is produced by compressed air or also by a gas whose pressure is higher than the pressure of the gas enclosed in the casing of the devide.

DESCRIPTION OF THE DRAWINGS

FIG. 2 is a partial side sectional view of a centrifugal pump constructed according to the invention;

FIG. 3 is an enlarged view of a portion of FIG. 2 illustrating in further detail the construction of the pump;

The invention will now be described with reference to examples of various embodiments.

Figure 1:
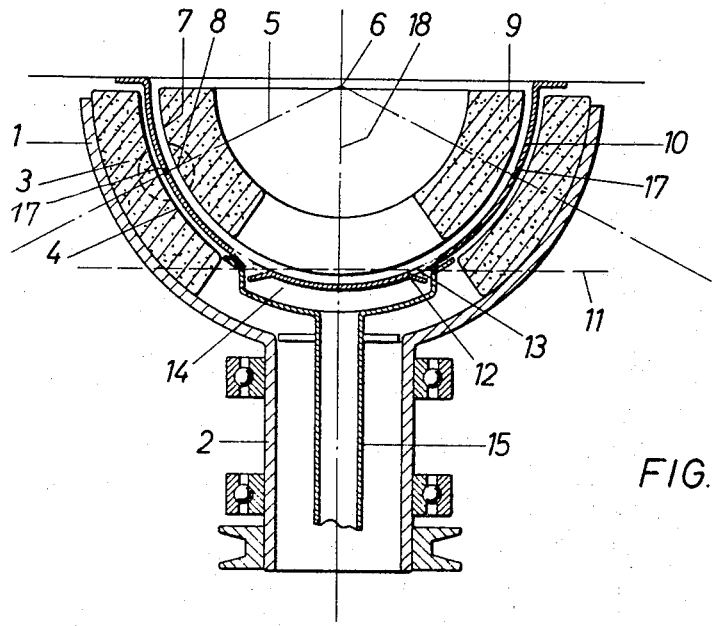
FIG. 1 is a sectional view of a rotatable magnetic machine according to the invention.

FIG. 1 shows a rotating magnetic machine in accordance with the invention and comprising a first magnetic pole ring 1 which is driven via a hollow shaft 2 and whose magnetic poles 3 of alternating polarity are arranged around the circumference on a concave spherical surface 4 made up of a plurality of segments. The centers of the isodynamic lines of these magnetic poles lie on the surface of a cone 5, whose apex 6 coincides with the center of the concave spherical surface 4 of the pole ring 1 as well as the center of the convex surface 7 made up of a plurality of segments of the second pole ring 9 having the magnetic poles 8. The separating wall 10 is disposed in the air gap between the concave surface 4 and the convex surface 7.

Uniformly distributed over the circumference of the pitch circle plane 11 conical recesses 12 are provided whose lowest point is penetrated by a bore 13. These bores 13 communicate with the cavity 14 which is connected to a chamber which is under a higher pressure than on the opposite side of the spherical separating wall 10, via a conduit 15. A suitable flowable material is conducted through conduit 15, e.g. mains water in the case of pumps for waste water, liquid or gaseous refrigerant in the case of refrigeration compressors, light oil in the case of heavy oil pumps, and compressed gas in the case of gas compressors, or also compressed air in the case of water pumps, where a thin fluid bearing film is formed in the air gap. The magnetic lines of force 17 which pass through the air gap and the separating wall 10 produce forces which, in operation, can be resolved into circumferentially directed radial and axial vectors. Any tilting of the pole ring 9 about an axis other than the rotational axis 18 results in forces restoring the pole ring 9 to its original position. Since these forces only act on a hemisphere, a resultant force 16 (FIG. 6) directed towards the pole of the separating wall 10, remains.

FIG. 2 shows a centrifugal pump in axial section, with a pole ring supported in a contactless bearing. The rotating magnetic filed is produced by the pole ring 21 which comprising approximately co-axial sheet metal rings, preferably a spiral construction, and in whose slots 22 coils 23 are inserted. The casing 24 merges into a flange 25 at the inlet side, whilst it is connected to the separating wall 26 on the pump side around its perimeter. The flange and the separating wall are interconnected by the pipe 27 through which the throughput medium flows in the direction of the arrow 28. The impellor comprises a blade ring 29 and the pole ring 30 which is of soft magnetic material and which preferably carries a squirrel cage winding 20 like the rotor of an electric motor. The reverse side of the blade ring is formed by a cavity 31 which contains a heavy ring 32 which holds the impellor in equilibrium at the equatorial plane 34. The impellor also has at its lower surface facing away from the air gap a curved surface 46 which coacts with the curved surface 47' to form a bearing gap between the impellor and the stationary parts of the machine.

After leaving the blading 29, the stream which enters in the direction of the arrow 28 enters the bladeless annular region 35, and thereafter the discharge whirl is converted into a rise in pressure through the guide blade ring 36 whose blades effect a diversion of the discharge stream from the impellor having a circumferential component 37 into a whirl-less flow which enters the pipe connection 38 on the pressure side axially. When the pump is started up, the convex surface 39 of the runner lies in the concave surface of the separating wall 26. A liquid bearing film is formed by grooves 44, 45 shown in FIG. 2. The greater the circumferential velocity and the viscosity, the thicker is the film, depending on these grooves 44, 45, whilst the thickness of the layer is inversely proportional to the axial thrust which is produced magnetically and hydraulically. Depending on the point of operation, there is thus produced an equilibrium of forces which results in stable and contactless rotation of the impeller. The blades 36 are interconnected by a wall of hollow spherical form 19. This wall has the effect of maintain the impellor 29, 30, 32 in its position after the electric power supply is switched off. The distribution of the masses, particularly 30 and 32, is so chosen that the integral of the mass distribution multiplied by the square of the diameter (moment of inertia) lying in the rotational plane is greater than that lying in other planes. This has the effect of maintaining the impeller stable in the position dictated by the considerations of magnetism and flow mechanics, after the electric power supply is switched off, by reason of its gyroscopic forces.

FIG. 3 shows diagrammatically the spherical separating member 26 of FIG. 2, on which a plastics foil 40 of a material having low static friction properties is mounted, the foil 40 being secured along the periphery 41 and along the securing ring 42 in a liquid tight manner. Between the wall 26 and the foil 40 there is a thin layer of liquid 43 which has the effect of making the specific compressive thrust per unit area of the foil 40 against the pole ring 30 uniform in all places. For the purpose of building up a hydrodynamic bearing layer grooves 44 and 45 are provided in the foil 40, by means of which a pressure builds up in the central region 47 which results in the lifting off of the impellor.

Figure 4:
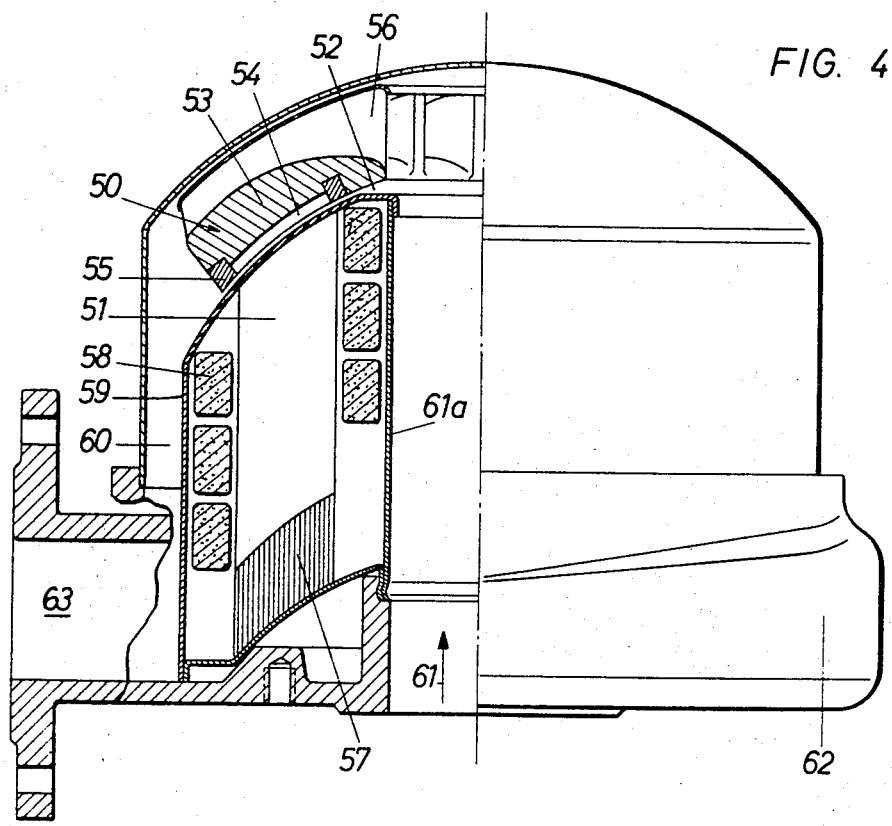
FIG. 4 is a partial sectional view of a different embodiment of a centrifugal pump constructed according to the invention.

FIG. 4 shows an embodiment of the subject of the invention, in which the pole face of the rotating pole ring 50 is of concave construction and the pole face of the stationary pole ring 51 towards the air gap 52 is of convex construction. The pole ring 50 comprises the magnet iron 53 of the rotor, a squirrel cage winding 54 and rotating short-circuiting rings 55 of a material of high electrical conductivity which forms part of the winding 54. The blades 56 are arranged above the magnet iron 53. The stator 51 is built up of a spiral construction of soft magnetic sheet iron, whose windings 57 are moreover relatively axially displaced. The coils 58 are arranged on conical surfaces and are separated by the casing 59, which at the same time forms the non-magnetic wall in the air gap 52, from the pump chamber 60. The intake is in the direction of the arrow 61 through the intake pipe. The spiral casing 62 terminates in the discharge pipe connection 63.

Figure 5:
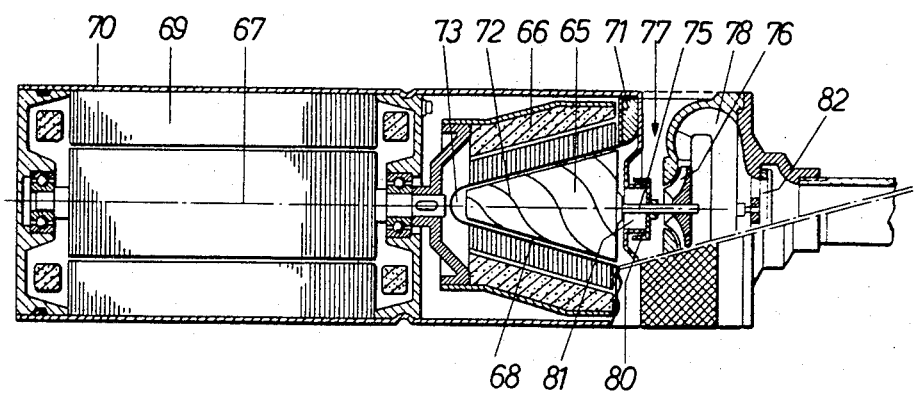
FIG. 5 is a further sectional view of an embodiment of a centrifugal pump constructed according to the invention.

FIG. 5 shows a further alternative of the invention. The air gap between the rotor 65 and an external rotating magnet 66 is produced by a notional straight line 68 which rotates about the rotational axis 67. Thus the air gap forms the curved surface of a truncated cone. The rotating permanent magnet 66 is driven by the motor 69. The motor casing 70 is sealingly connected to the non-magnetic separating wall 71, so that neither liquid nor gas can penetrate into the interior of the motor. On the surface of the rotor 65, which rotates anticlockwise as viewed from the right, grooves 72 are provided which again serve the purpose of producing an excess pressure in the chamber 73 and thus fulfil the same function as the grooves 44 and 45 described (in FIG. 3). Via a spindle 75, the rotor 65 drives a pump impellor 76, which has its intake in the direction of the arrow 77 and builds up a pressure in a concentric pump casing 78.

The annular cover 80 prevents the ingress of sand into the chamber 81, which communicates with the gap 68. The non-return valve 82 prevents reverse flow of the column of water where the pump is situated below the system, e.g. in fountains.

Figure 6:
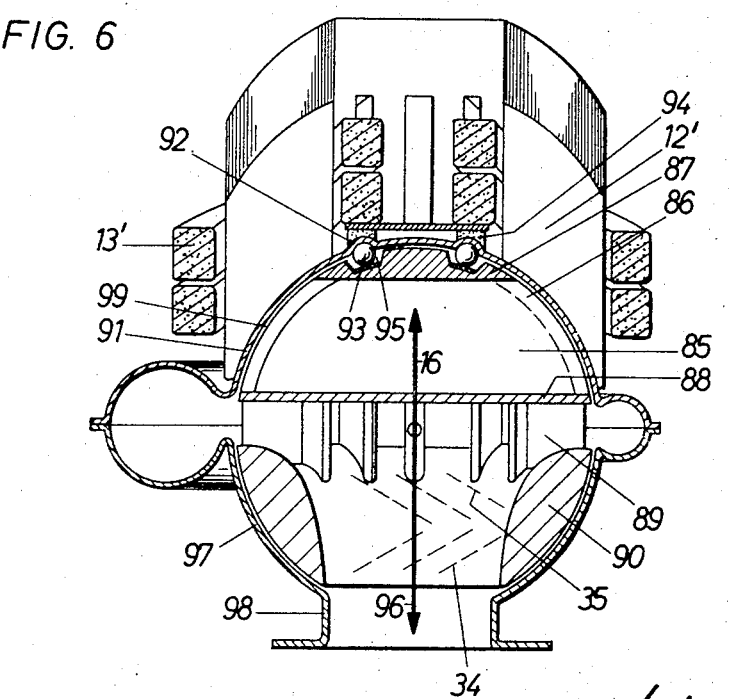
FIG. 6 is a sectional view of a still further embodiment of a centrifugal pump constructed according to the invention.

FIG. 6 shows a further variation of the invention in the form of a liquid pump for large quantities at low pressures. The pole ring 85 with the conductors 86 and the short-circuiting member 87 and the short-circuiting plate 88 carries blading 89 which is bounded by an annular cover 90. The rotating field is produced by the stationary pole ring 12' and the coils 13'. The separating wall 91 has a groove 92 which contains balls 93 of ferromagnetic material. By means of a ring magnet 94 the balls lie against the separating wall 91. There is also a groove 95 in the short-circuiting member 86. When the pump is switched on, the magnetic vector 16 causes the balls 93 to define an axial ball bearing together with the grooves 92 and 95. As soon as material is being conveyed, the vector 96 which results from the hydraulic rotor propulsion overcomes the vector 16, so that the external spherical surface of the annular cover 90 is supported in the internal spherical surface 97 of the portion 98 of the casing on the inlet side, the two surfaces forming the bearing gap. A hydrodynamic bearing film is built up by grooves 34 and 35. If the vector 96 becomes smaller than the vector 16 resulting from a change of resistance in the hydraulic system, the concave region 99 cooperates with the surface of the pole ring 85, so that the balls 93 assume the supporting function only during the starting-up phase. The groove 95 is of such a width as to enable the rotor to tilt to the desired extent.

I claim:

1. A rotating magnetic machine having a first pole ring which produces a rotating magnetic field and which has poles distributed over the circumference and facing a common air gap, a rotating second magnetic pole ring facing said air gap and having the same number of magnetic poles distributed over the circumference and effecting closure of the magnetic circuits between adjacent magnetic poles, the air gap being disposed on the curved surface of a rotatable body which tapers in the axial direction, and a separating wall in said air gap separating said pole rings, characterized in that the air gap also defines a bearing gap for supporting the rotating pole ring, in that a hollow shaft connects with the first pole ring, the separating wall has apertures therein arranged in the plane of rotation, and a conduit extends through said hollow shaft to said apertures through which a flowable material may be introduced under pressure to produce a hydrodynamic bearing film in the bearing gap during operation of the machine to overcome the magnetic, axially directed force vector which acts on the rotating pole ring.

2. A rotating magnetic machine having a first pole ring which produces a rotating magnetic filed and which has poles distributed over the circumference and facing a common air gap, a rotating second magnetic pole ring facing said air gap and having the same number of magnetic poles distributed over the circumference and effecting closure of the magnetic circuits between adjacent magnetic poles, the air gap being disposed on the curved surface of a rotatable body which tapers in the axial direction, and a separating wall in said air gap separating said pole rings, characterized in that the air gap also defines a bearing gap for supporting the rotating pole ring, in that the separating wall has apertures therein arranged in the plane of rotation, in having recessed regions communicating with said apertures, and in having means to introduce a flowable material under pressure through said apertures to produce a hydrodynamic bearing film in the bearing gap during operation of the machine to overcome the magnetic axially directed force vector which acts on the rotating pole ring.

3. A rotating magnetic machine adapted for operation immersed in a liquid having a first pole ring with a spherical surface thereon which produces a rotating magnetic field and which has poles distributed over the circumference and facing a common gap and a rotating second magnetic pole ring having a spherical surface thereon facing said gap and having the same number of magnetic poles distributed over the circumference and effecting closure of the magnetic circuits between adjacent magnetic poles, the gap being bounded in part by said spherical surfaces, characterized in that the gap is a bearing gap for supporting the rotating pole ring, in that means are included for introducing a flowable material under pressure into said gap for producing a fluid bearing film therein, the flowable material being during operation of the machine subjected to a pressure sufficient to overcome the magnetic, axially directed force vector which acts on the rotating pole ring, and characterized further in that the thermal conductivity of a surface layer of the surfaces bounding the gap is so small that at least part of the material penetrating into the gap evaporates.

4. A rotating magnetic machine having a first pole ring with a spherical surface thereon which produces a rotating magnetic field and which has poles distributed over the circumference thereof and facing a common gap, and a rotating second magnetic pole ring having a spherical surface thereon facing said gap and having the same number of magnetic poles distributed over the circumference and effecting closure of the magnetic circuits between adjacent magnetic poles, the gap being bounded in part by said spherical surfaces, characterized in that the gap is a bearing gap for supporting the rotating pole ring, in that a separating wall is included in the gap, in that grooves are included in a plane which bounds the gap, and in that means are included for introducing a flowable material into the grooves to produce a hydrodynamic bearing film in the gap, the flowable material being during operation of the machine subjected to a pressure exerted by the material flowing through the grooves sufficient to overcome the magnetic axially directed force vector which acts on the rotating pole ring, and eddy currents being produced in the separating wall by the rotating second magnetic pole ring which heats the wall and gap.

5. A rotatable magnetic machine comprising a first pole ring for producing a rotatable magnetic field, said first pole ring having a plurality of poles distributed over the circumference thereof and having a first concentric surface including first segments inclined to the axis of rotation of said machine, and a second rotatable pole ring having the same number of poles as said first pole ring and having a second concentric surface spaced from said first concentric surface with said second concentric surface including second segments oppositely disposed to said first segments and inclined to said axis with the space between oppositely disposed first and second segments forming a gap between said pole rings to effect closure of the magnetic circuit between adjacent poles, characterized in that said machine has means for introducing a fluid under pressure into said gap to form a fluid bearing film between said pole rings, said film axially supporting said first pole ring with respect to said second pole ring and said film overcoming the magnetic axially directed force vector acting on the pole rings.

6. A rotatable magnetic machine according to claim 5 in that the means for introducing said fluid into said gap includes grooves in a surface bounding the gap extending in an inclined and circumferential direction to said axis of rotation.

7. A rotatable magnetic machine according to claim 5 further characterized in having a separating wall in the gap, and apertures in the separating wall which are located in the plane of rotation of said machine through which said fluid is introduced into said gap.

8. A rotatable magnetic machine according to claim 5 further characterized in that the first and second segments each form portions of spheres.

9. A rotatable magnetic machine according to claim 5 further characterized in that one of said pole rings is mounted for pivotal movement about an axis perpendicular to the axis of rotation of said machine.

10. A rotatable magnetic machine according to claim 5 further characterized in that the centers of the isodynamic lines of the magnetic poles are disposed on radii of portions of spheres which approximately coincide with the surfaces of the pole rings facing said gap.

11. A rotatable magnetic machine according to claim 5 further characterized in having a thin wall extending in the gap, in having one of said segments stationary to form a closed chamber with the thin wall and in having a deformable material in said chamber.

12. A rotatable magnetic machine according to claim 5 further characterized in that the first and second segments are disposed on conical surfaces.

13. A rotatable magnetic machine according to claim 5 further characterized in having a separating wall in said gap and in having a support means effective during start up of the machine to provide an axial support between the rotatable pole ring and the separating wall.

14. A rotatable magnetic machine according to claim 13 further characterized in that the support means comprises having a groove in the separating wall and balls arranged in said groove.

15. A rotatable magnetic machine according to claim 14 further characterized in having magnets to hold said balls in said groove.

16. A rotatable magnetic machine according to claim 5 further characterized in that the distribution of masses comprising the rotatable portions of said machine is such that a larger moment of inertia is present in the plane of rotation of the machine that in other planes.

17. A rotatable magnetic machine according to claim 5 wherein the surface of the rotatable pole ring facing away from the gap is spherical and wherein said machine has countersurfaces forming with said surface facing away from said gap an additional bearing gap.

* * * * *